(12) United States Patent
Rubio

(10) Patent No.: US 11,138,004 B1
(45) Date of Patent: Oct. 5, 2021

(54) MODIFICATION OF APPLICATION FUNCTIONALITY USING OBJECT-ORIENTED CONFIGURATION DATA

(71) Applicant: PayPal, Inc., San Jose, CA (US)

(72) Inventor: Jose Eduardo Rubio, Austin, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/882,121

(22) Filed: May 22, 2020

(51) Int. Cl.
  *G06F 8/65* (2018.01)
  *G06F 8/71* (2018.01)
  *G06F 9/445* (2018.01)
  *G06F 8/30* (2018.01)
  *G06F 9/50* (2006.01)

(52) U.S. Cl.
  CPC .......... *G06F 8/71* (2013.01); *G06F 8/315* (2013.01); *G06F 8/65* (2013.01); *G06F 9/44505* (2013.01); *G06F 9/5005* (2013.01)

(58) Field of Classification Search
  USPC ........................................................ 717/121
  See application file for complete search history.

(56) References Cited

U.S. PATENT DOCUMENTS

| | | | | |
|---|---|---|---|---|
| 6,857,118 B2 * | 2/2005 | Karr | .......... | G06F 9/4486 717/114 |
| 6,868,526 B2 * | 3/2005 | Singh | .......... | G06F 8/34 345/619 |
| 7,730,450 B2 * | 6/2010 | Mercer | .......... | G06F 16/219 717/120 |
| 8,327,323 B2 * | 12/2012 | Holtz | .......... | G06F 9/4492 717/108 |
| 9,323,793 B2 * | 4/2016 | Choudhary | .......... | G06F 16/211 |
| 10,402,174 B2 * | 9/2019 | Varadarajan | .......... | G06F 8/36 |

(Continued)

OTHER PUBLICATIONS

"Decorator [Design Pattern]"; Refactiong.Guru webpage [full url in ref.] as Captured by the Wayback Machine Internet Archive (archive. org) on May 2, 2020 (Year: 2020).*

(Continued)

*Primary Examiner* — Qing Chen
*Assistant Examiner* — Clint Thatcher
(74) *Attorney, Agent, or Firm* — Kowert, Hood, Munyon, Rankin & Goetzel, P.C.

(57) ABSTRACT

Techniques are disclosed relating to modifying the functionality of software applications using object-oriented configuration data. In some embodiments, a configuration module may receive, from an application hosted within a server system, a request for configuration data that is usable to modify the manner in which the application performs a computing operation. In some embodiments, the request may specify a particular data object and include contextual information. The configuration may receive, from a configuration service in the server system, a configuration data package that includes a default definition for the particular data object and an override definition for a contextual override of the particular data object. The configuration module may determine, based on the contextual information, that the contextual override applies and return the configuration data, including data from the override definition, to the application.

20 Claims, 9 Drawing Sheets

(56) References Cited

U.S. PATENT DOCUMENTS

2020/0356350 A1* 11/2020 Penland ................. G06F 8/315

OTHER PUBLICATIONS

Nam Ha Minh; "12 Rules of Overriding in Java You Should Know"; CodeJava.net website [full url in ref.]; Aug. 14, 2019 (Year: 2019).*
"Overriding and Hiding Methods"; Sun Microsystems Java Tutorial [full url in ref.]; Aug. 2005 (Year: 2005).*

* cited by examiner

250

500

```
┌─────────────────────────────────────────────────────────────────────────┐
│ Receive a request for configuration data usable to modify a performance │
│ of a particular operation by an application, where the request specifies│
│ a particular data object and first contextual information               │
│                                   502                                   │
└─────────────────────────────────────────────────────────────────────────┘
                                     │
                                     ▼
┌─────────────────────────────────────────────────────────────────────────┐
│         Send, to a configuration service, a first configuration         │
│                            data request                                 │
│                                   504                                   │
└─────────────────────────────────────────────────────────────────────────┘
                                     │
                                     ▼
┌─────────────────────────────────────────────────────────────────────────┐
│ Receive, from the configuration service, a configuration data package   │
│ that includes:                                                          │
│                                                                         │
│ A default definition for the particular data object that includes a     │
│ first default value for a first attribute of a set of attributes; and   │
│ A first override definition for a contextual override associated with   │
│ the particular data object, where the first override definition         │
│ includes a first override value for the first attribute                 │
│                                   506                                   │
└─────────────────────────────────────────────────────────────────────────┘
                                     │
                                     ▼
┌─────────────────────────────────────────────────────────────────────────┐
│ Determine that the first contextual override applies based on the first │
│                       contextual information                            │
│                                   508                                   │
└─────────────────────────────────────────────────────────────────────────┘
                                     │
                                     ▼
┌─────────────────────────────────────────────────────────────────────────┐
│ Provide the configuration data to the application, where the            │
│ configuration data specifies the first override value for the first     │
│                             attribute                                   │
│                                   510                                   │
└─────────────────────────────────────────────────────────────────────────┘
```

Receive, from an application, a first configuration data request corresponding to a particular data object, where the first configuration data request includes first contextual information
602

↓

Access an object definition corresponding to the particular data object, where the object definition includes:
A first default value for a first attribute of a set of attributes; and
A second default value for a second attribute of the set of attributes
604

↓

Compare the first contextual information to override definitions for a plurality of contextual overrides associated with the particular data object
606

↓

Based on the comparison, determine that a first one of the plurality of contextual overrides applies to the first configuration data request, where the first contextual override includes a first override value for the first attribute
608

↓

Provide configuration data to the application, where the configuration data specifies:
The first override value for the first attribute; and
The second default value for the second attribute
610

```
Receive, via a configuration interface, a selection of a particular data object to override, where the
particular data object includes a set of attributes, and where a first one of the set of attributes has
                                    a first default value
                                          702
```

↓

```
Receive, via the configuration interface, a first override definition of a first contextual override of
            the particular data object, where the first override definition includes:
                  A first context definition including one or more conditions; and
A first value to apply for the first attribute in response to a determination that the one or more
                       conditions in the first context definition are met
                                          704
```

↓

```
Store, in a configuration data store, the first override definition of the first contextual override
                                          706
```

*FIG. 7*

MODIFICATION OF APPLICATION FUNCTIONALITY USING OBJECT-ORIENTED CONFIGURATION DATA

BACKGROUND

Technical Field

This disclosure relates generally to modifying computer system functionality, and more particularly to modifying the functionality of an application using object-oriented configuration data.

Description of the Related Art

Server systems may provide various web services in which the computing resources of the server system perform computing operations on behalf of end users. In many instances, an application may modify the manner in which it performs various computing operations based on the context in which the operation is to be performed. As a non-limiting example, an application may perform an operation (such as user authentication) differently if the end user is using an authorized computing device (e.g., a user device registered to the end user) than if the end user is accessing the software application via a public terminal. One common technique for modifying the functionality of a software application is to represent a set of rules defining this functionality in a large configuration file, which may be consulted to determine the manner in which to perform an operation. This technique presents various technical shortcomings, however. For example, using such a technique, the process of modifying a given rule is a slow and error-prone process that requires significant user (e.g., developer) time and effort. Further, using such a technique, the updated configuration file would need to then be disseminated to the (potentially numerous) applications within the server system, itself a burdensome and time-consuming task.

BRIEF DESCRIPTION OF THE DRAWINGS

FIG. 5 is a flow diagram illustrating an example method for providing, by a configuration module, object-oriented configuration data to an application, according to some embodiments.

FIG. 6 is a flow diagram illustrating an example method for providing, by a configuration service, object-oriented configuration data to an application, according to some embodiments.

FIG. 7 is a flow diagram illustrating an example method for specifying object-oriented configuration data, according to some embodiments.

DETAILED DESCRIPTION

Figure 1:
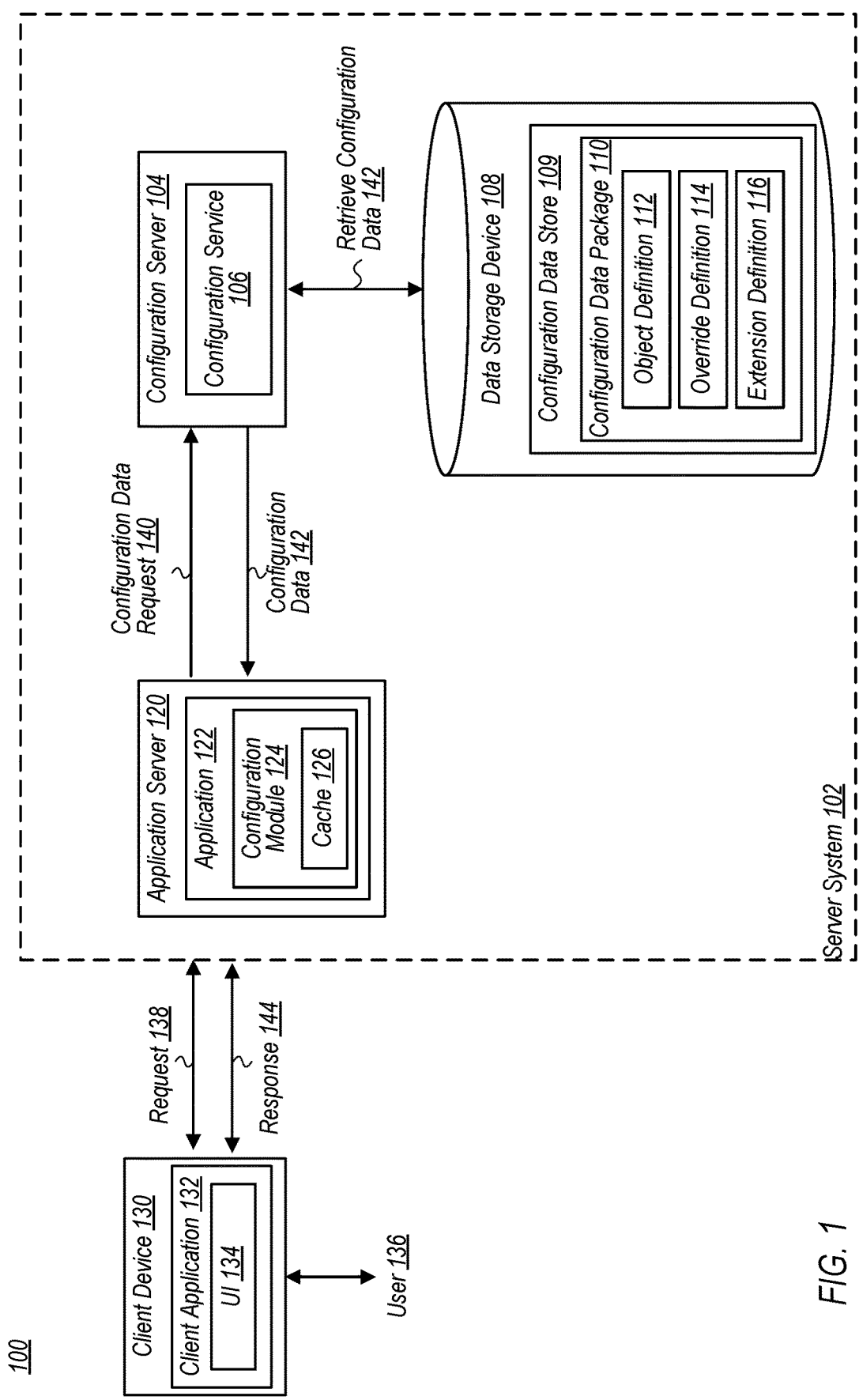
FIG. 1 is a block diagram illustrating an example server system operable to modify the functionality of a software application using object-oriented configuration data, according to some embodiments.

A server system may provide various web services to users in which the computing resources of the server system (including hardware or software elements of the server system) perform computing operations on behalf of a requesting user. Non-limiting examples of web services a server system may provide include email services, social media services, streaming media services, online payment services, etc. In many instances, a software application hosted by a server system may implement different rules when providing the web service such that the manner in which a given computing operation is performed varies depending on the operation's "context." As used herein, the term "context" broadly refers to the circumstances or conditions associated with a computing operation, and, similarly, the term "contextual information" refers to information that is indicative of the circumstances or conditions associated with a computing operation. In some instances, contextual information may include information relating to the user requesting the performance of an operation. Non-limiting examples of such user-specific contextual information include an identifier (e.g., user account identifier) associated with the user, the geographical location of the user at the time the operation is requested, the client device used to send the request, etc. Further, in some instances, contextual information may include information that is specific to the particular web service that the server system provides. As one non-limiting example, consider an instance in which a server system provides an online payment service that enables end users to perform online financial transactions (e.g., sending or receiving funds) or merchants to receive funds from users during financial transactions. In this non-limiting example, operation-specific contextual information may include an amount of a funds transfer, an identifier (e.g., user account identifier) associated with the recipient, the funding source, a merchant identifier, a purchase amount, etc.

In such a scenario, the software applications hosted by the server system may implement various rules to modify the functionality of the online payment service, as desired, based on the context of the requested operation. As a non-limiting example, the online payment service may be operable to facilitate fund transfers between users and implement a rule stating that, for funds transfers in which the amount exceeds $1,000 USD and the country location of the sender and recipient differ, additionally authentication operations are to be performed. In prior systems, such rules are typically represented as logic in code. As one non-limiting example, a set of rules for a given software application may be specified in large configuration files, which presents various technical shortcomings. For example, in such a system, modifying a rule (e.g., to modify the context in which a rule applies or the modifications to be made if a rule is triggered) requires manually updating the configuration file in which the rule is defined, a time-intensive and error-prone task. Additionally, in some such prior systems, the updated version of the configuration file would need to be disseminated to various applications within the server system to ensure that the software applications involved in providing this functionality have the updated version of the rule. As a result, creating and modifying rules in prior systems presents a significant technical problem. Further, rather than addressing these technical problems, prior systems instead attempt to optimize the process of consolidating and disseminating the configuration files to the various applications within a server system, ignoring the underlying technical problem presented by implementing rules using these monolithic configuration files.

In various embodiments, however, the techniques described herein may solve these and other technical problems by modifying the functionality of a software application (e.g., the one or more software applications hosted by a server system to provide a web service) using object-oriented configuration data. Stated differently, various disclosed embodiments utilize object-oriented techniques to model configuration data as objects, which may be used to modify a software application's functionality based on the context. Broadly speaking, the disclosed systems and methods may be said to operate in two phases. During a first phase, a user associated with a server system (e.g., a software developer) may utilize the disclosed techniques to specify configuration data in an object-oriented manner. For example, in various embodiments, the developer may use the disclosed system to specify an object definition for a data object, an override definition for a contextual override of one or more data objects, or an extension definition for an extension of one or more data objects. Some such embodiments are described in more detail below with reference to FIGS. 4 and 7. During a second phase, the disclosed systems and methods may use the object-oriented configuration data to modify the functionality of one or more software applications in a server system. Various such embodiments are described in more detail below with reference to FIGS. 1 and 5-6.

The disclosed techniques may provide various technical benefits. As one non-limiting example, in various embodiments, the disclosed systems and methods provide a tool that enables a developer to more easily generate custom configurations for different contexts (that is, create rules) in a centralized way, rather than engage in the time- and labor-intensive process of manually editing a configuration file and disseminating the file to each of the (potentially numerous) applications. This, in turn, may enable a user (e.g., a developer) of the disclosed systems and methods to modify the functionality of numerous applications in a server system by modifying the object-oriented configuration data once, rather than modifying the code for each of these application separately. Thus, various embodiments enable developers to quickly and easily develop robust configurations that may be implemented in a centralized manner, saving time and improving the operation of the server system as a whole.

In FIG. 1, block diagram 100 depicts a server system 102 that, in various embodiments, is operable to modify the functionality of a software application using object-oriented configuration data. For example, in various embodiments, server system 102 is operable to provide one or more computing resources to various end users over one or more networks (not shown, for clarity). In the depicted embodiment, server system 102 includes application server 120 hosting application 122, which may be accessed by user 136 over one or more networks using client device 130. Additionally, note that, in some embodiments, server system 102 is operable to provide computing resources that may be integrated with (or otherwise used by) web services provided by third parties. As one non-limiting example, server system 102, in some embodiments, provides an online payment service that may be used by end users to perform online financial transactions (e.g., sending or receiving funds) or utilized by merchants to receive funds from users during financial transactions, as described above. Note, however, that this embodiment is described merely as one non-limiting example. In other embodiments, server system 102 may be used to provide any of various suitable web services (e.g., an email service, streaming media service, etc.) and application server 120 may be used to host any of various types of applications 122. Further, note that although only a single application server 120 is depicted in FIG. 1, this simplified embodiment is provided merely as a non-limiting example. In other embodiments, server system 102 may include any suitable number of application servers 120, any of which may host one or more applications 122.

FIG. 1 further includes client device 130 that is used by user 136. Client device 130 may be any of various suitable computing devices, such as a smartphone, laptop computer, desktop computer, tablet computer, etc. that user 136 may use to access application 122 hosted by application server 120. For example, in various embodiments, client device 130 executes a client application 132, such as a web browser or dedicated software application, with a user interface (UI) 134 that the user 136 may use to access one or more computing resources provided by application server 120, such as client application 132.

Application 122 may perform various operations as part of providing computing resources to user 136 of client device 130. As noted above, in various embodiments, application 122 may implement various rules to modify the manner in which it performs a given operation based on the context. In various embodiments, such rules may be implemented by modeling configuration data using object-oriented techniques (e.g., as data objects, context-based overrides of data objects, context-based extensions of data objects, etc.) and using the object-oriented configuration data to modify application 122's functionality. Stated differently, in various embodiments, the disclosed techniques may be used to separate these rules (with potentially numerous permutations) from the configuration files described above and instead encapsulate the logic of those rules into object-oriented configuration data that is applied at runtime. For example, as shown in FIG. 1, user 136 may send a request 138 to application 122, requesting that application 122 perform a computing operation. Note that the nature of the operation requested by the user 136 may vary based on the nature of the web services provided by the application 122. Continuing with the non-limiting example above, assume that server system 102 provides an online payment service and that application 122 is operable to facilitate transfers of funds between users of the server system 102, subject to transfer limits implemented using object-oriented configuration data. In such an instance, the request 138 may include a request to transfer funds from an account associated with the user 136 to another user of the server system 102.

Note that, in FIG. 1, application 122 includes configuration module 124, which, in various embodiments, is operable to retrieve context-specific configuration data from a configuration service 106, which the application 122 may use to modify the manner in which it performs a requested operation. For example, in determining how to service the request 138, the application 122 may send a request for configuration data to the configuration module 124. In some embodiments, this request may identify a particular data object for which configuration data is requested. Additionally, in some embodiments, this request for configuration data may include one or more items of contextual information. As one example, in some embodiments, a request for configuration data may take the form of a "get" request, such as: get(object_Name, contextual_Information). Once it receives this request, configuration module 124 may retrieve and return the appropriate configuration data based on the identified data object and the contextual information. In the depicted embodiment, configuration module 124 includes cache 126. In some embodiments, the configuration module 124 may first check the cache 126 to determine whether the requested configuration data is already stored locally and, if so, return it to the application 122. If, however, the requested configuration data is not already stored in the cache 126, the configuration module may instead request it from the configuration service 106.

In FIG. 1, server system 102 includes configuration server 104 shown hosting a configuration service 106. Further, in the depicted embodiment, server system 102 includes (or has access to) data storage device 108, which may be implemented using any of various suitable data storage technologies. Data storage device 108, in the depicted embodiment, is shown storing configuration data store 109, described below. In one non-limiting example, configuration data store 109 may be implemented using a document-oriented database provided by Couchbase™, though any other suitable data storage technology may be used. In various embodiments, configuration service 106 is operable to receive a configuration data request 140 from the configuration module 124, retrieve the appropriate configuration data from configuration data store 109, and provide it to a requesting application (e.g., application 122) in the server system 102. (Note that, although configuration service 106 is shown providing configuration data 142 to a single application 122 executing on a single application server 120, this simplified embodiment is provided merely as one non-limiting example. In other embodiments, configuration server 104 and configuration service 106 may be used to provide configuration data to any suitable number of applications 122 executing on any suitable number of application servers 120.)

Data storage device 108 stores configuration data store 109, which includes configuration data package 110. In the depicted embodiment, configuration data package 110 includes object definition 112, override definition 114, and extension definition 116. In various embodiments, the techniques disclosed herein may be used to specify object definitions 112, override definitions 114, and extension definitions 116, as described in more detail below with reference to FIG. 4. For example, in some embodiments, a developer associated with an application 122, or the server system 102 more generally, may define custom object definitions 112, override definitions 114, or extension definitions 116. Note that, although configuration data store 109 of FIG. 1 is shown with only a single configuration data package 110 for clarity, this simplified depiction is provided merely as one non-limiting embodiment. In various embodiments, configuration data store 109 may include any number of configuration data packages 110, any of which may include definitions for one or more data objects, contextual overrides, extensions, or contextual extensions.

Various embodiments of configuration data package 110, object definitions 112, override definitions 114, and extension definitions 116 are described in more detail below with reference to FIG. 2A. For the present discussion, note that, in various embodiments, an object definition 112 is used to store default values for one or more attributes. Continuing with the example above, for instance, object definition 112 may be used to store a default value for a transfer limit to be imposed on limits between users of the server system 102. As noted above, however, the object-oriented configuration data described herein may be used to implement various rules, as desired. As such, the configuration data that is ultimately returned to an application 122 for a given data object may not be the default value specified in the object definition 112 for that data object. Instead, the configuration data returned may be one or more values specified in an override definition 114 of a contextual-override or an extension definition 116 of a contextual extension of the data object. For example, in some embodiments, an override definition 114 may include an override value for one or more attributes of the particular data object and a context definition specifying one or more conditions. In various embodiments, when the contextual information for the requested operation satisfies the conditions set out in the context definition of an override definition 114, the override value(s) for the one or more attributes may be included in the configuration data returned to the application 122 (e.g., instead of or in addition to one or more of the default values in the object definition 112 for the object). Further, in some embodiments, an extension definition 116 may include a value for one or more attributes that are not included in the object definition 112. In this way, an extension may be said to "extend" a data object by adding attributes to the data object when certain contextual conditions are satisfied. As with the override definition 114, an extension definition 116 may also include a context definition that specifies one or more conditions such that, when the contextual information for the requested operation satisfies the context definition of the extension definition 116, the value(s) for the one or more attributes in the extension definition 116 may be included in the configuration data returned to the application 122. Note, however, that in some embodiments, configuration data package 110 may include an extension definition 116 for a "non-contextual" extension that does not include a context definition. Instead, in some such embodiments, the extension definition 116 for a non-contextual extension of a particular data object may specify a default value for one or more attributes that are not included in the object definition 112 for the particular data object. As described in more detail below, non-contextual extensions may be overridden or extended (e.g., with contextual overrides or contextual extensions, respectively), according to various embodiments.

In various embodiments, related configuration data may be grouped into configuration data packages 110 (also referred to herein as a "subscription") based on the applications within the server system 102 to which the configuration data relates. In the depicted embodiment, configuration data package 110 includes a single object definition 112, override definition 114, and extension definition 116. Note, however, that this embodiment is provided merely as one non-limiting example. In other embodiment, a configuration data package may include any number and combination of object definition 112, override definition 114, and extension definition 116. (Also note that, in some embodiments, a given configuration data package 110 may not include each of an object definition 112, override definition 114, and extension definition 116. For example, a first configuration data package 110 may include one or more object definitions 112 but no override definitions 114 or extension definitions 116, while a second configuration data package 110 includes object definitions 112 and override definitions 114 but no extension definitions 116, etc.)

In various embodiments, a configuration data package 110 (or any of the definitions associated with a configuration data package 110) may be shared between different requesting applications within the server system 102, which may present various technical benefits. For example, when object-oriented data is created or modified, the disclosed system may simply create or update a definition for the configuration data and store it in the configuration data store 109, where it may be accessed and disseminated to requesting applications by the configuration service 106. In various embodiments, such a system is simpler and less burdensome than, as in prior systems, manually modifying a monolithic configuration file and distributing that file to every application in a server system.

In various embodiments, configuration service 106 is operable to retrieve configuration data 142 based on information contained in the configuration data request 140. In some embodiments, the configuration service 106 is operable to retrieve configuration data 142 that includes one or more configuration data packages 110, which may then be sent to the configuration module 124. For example, in some such embodiments, configuration data request 140 may identify a data object (e.g., using an object identifier value or package identifier value), which the configuration service 106 may use to retrieve one or more configuration data packages 110 from the configuration data store 109 and provide the package(s) 110 to the configuration module 124. In such embodiments, the configuration module 124 may use the definitions included in the one or more configuration data packages 110 to determine the appropriate configuration data to return to the application 122 based on the context. For example, the configuration module 124 may compare the contextual information for the current operation to context definitions for one or more override definitions 114 or extension definitions 116 for the data object and, based on the comparison, select the appropriate value for one or more attributes to return to the application as the requested configuration data. If configuration module 124 determines that the contextual information satisfies the context definition in an override definition 114, for instance, it may return the override value for an attribute as specified in that override definition 114. Similarly, if the configuration module 124 determines that the contextual information satisfies the context definition for an extension definition 116, it may return (instead of or in addition to one or more other values) a value for an extended attribute as specified in that extension definition 116. If, however, the configuration module 124 determines that the contextual information for the requested operation does not match the context definitions for any of the override definition(s) 114 or extension definition(s) 116, it may return one or more default values for the data object as specified by the data object's object definition 112. Various such embodiments are described in more detail below with reference to FIG. 5.

In other embodiments, such as those described with reference to FIG. 6, the configuration service 106 is operable to determine the specific item(s) of configuration data to return to the application 122 based on the contextual information for the requested operation. For example, in some such embodiments, configuration data request 140 from configuration module 124 may identify a data object (e.g., using an object identifier value or package identifier value) and include one or more items of contextual information associated with the requested operation. Based on this information, in some embodiments, configuration service 106 may retrieve one or more configuration data packages 110 from the configuration data store 109 and use the definitions included in the one or more packages 110 to determine the appropriate configuration data to return to the application 122 based on the context. For example, the configuration service 106, in such embodiments, may compare the contextual information for the current operation to context definitions for one or more override definitions 114 or extension definitions 116 for the data object and, based on the comparison, select the appropriate value for one or more attributes to return to the application as the requested configuration data. If the configuration service 106 determines that the contextual information satisfies the context definition in an override definition 114 or an extension definition 116, it may select the corresponding override value or extension value (or both) and return it to the configuration module 124 as the configuration data 142. If, however, the configuration service 106 determines that the contextual information for the requested operation does not match the context definitions for any of the override definition(s) 114 or extension definition(s) 116 in the configuration data package 110, it may return one or more default values for the data object, as specified in the data object's object definition 112, as the configuration data 142. Various such embodiments are described in more detail below with reference to FIG. 6.

Once the configuration module 124 has the appropriate configuration data for the requested operation (either by selecting that configuration data itself or having it selected by the configuration service 106), it may return that configuration data to the application 122, which may use the configuration data to modify the manner in which it performs a requested operation. Continuing with the running non-limiting example, for instance, the configuration data returned by the configuration module 124 may relate to a transfer limit to be imposed for the funds transfer requested by user 136 of client device 130 based on the context of the requested transfer. Using this configuration data, the application 122 may determine whether to permit the requested transfer. Further, in some embodiments, configuration module 124 may store configuration data 142 (e.g., one or more configuration data packages 110) in local cache 126 for use in serving future requests from application 122 for configuration data.

Note that, in some embodiments, the various elements of server system 102 may be located at the same physical location (e.g., within a single datacenter) or may be located at physical locations that are remote from one another. For example, application server 120, configuration server 104, and data storage device 108 may all be located at the same physical location, may all be located in different physical locations, or any suitable combination thereof. In some non-limiting embodiments, for example, application server 120 and configuration server 104 are located in different physical locations, and configuration module 124 may send the configuration data request 140 as a network call (e.g., a REST request over TCP/IP) to the configuration service 106 executing on the configuration server 104 to request the configuration data. Further, note that, in some embodiments, one or more of application 122 and configuration service 106 may be implemented as microservices executed by various computer systems in the server system 102. Additionally, note that, in some embodiments, the term "server system" (such as application server 120, configuration server 104, or server system 102) may refer to a single machine. In other embodiments, however, the term "server system" may refer to multiple machines executing (e.g., at one or more datacenters) for the benefit of a single entity. For example, in some embodiments, one or more of application server 120, configuration server 104, or server system 102 may be implemented using multiple machines located at one or more datacenters.

Figure 2A:
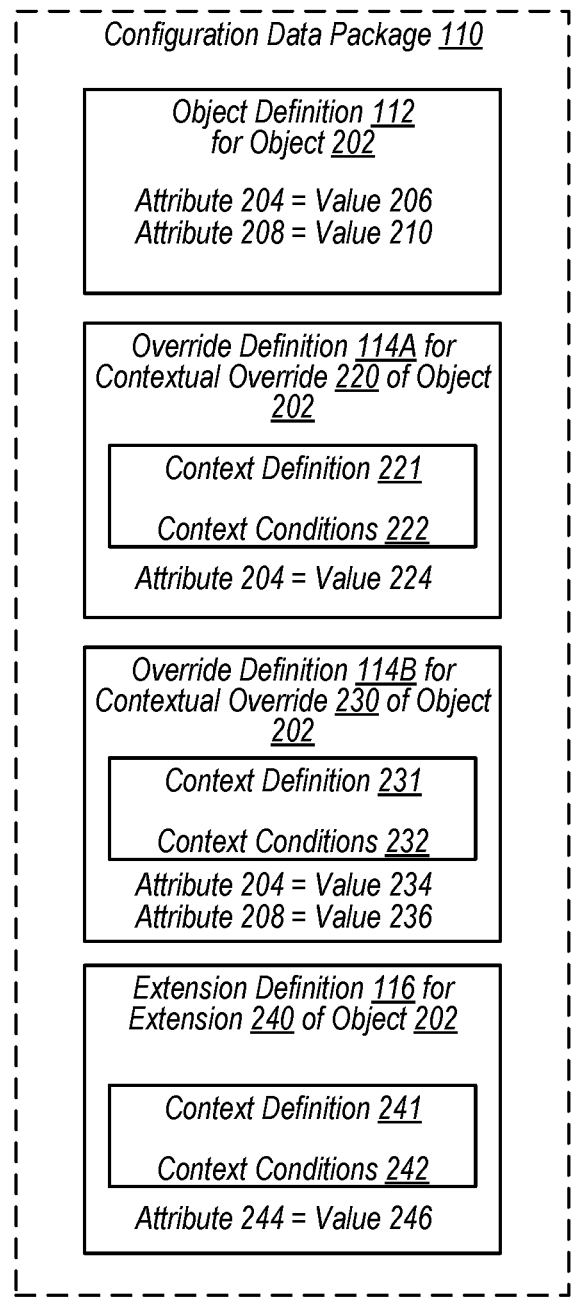
FIG. 2A is a block diagram illustrating an example configuration data package, according to some embodiments.

In FIG. 2A, block diagram 200 depicts an example configuration data package 110 in more detail, according to some embodiments. In block diagram 200, configuration data package 110 includes an object definition 112 for a data object 202. Data object 202 may be any of various suitable types of objects used to store default values for one or more attributes. For example, in FIG. 2A, object definition 112 for data object 202 specifies default values 206 for attribute 204 and default value 210 for attribute 208. Although only two attributes are shown in FIG. 2A, an object definition 112 may include default values for any suitable number (e.g., one or more) of attributes. Note that, in some embodiments, an object definition 112 for one object may reference an object definition for one or more other objects, for example to reference attributes and default values included in the object definition for the referenced object.

Configuration data package 110 of FIG. 2A further includes override definition 114A for contextual override 220 and override definition 114B for contextual override 230. Contextual overrides 220 and 230, in the depicted embodiment, are contextual overrides for the data object 202 and may be specified (e.g., by a developer of application 122) as described below with reference to FIG. 4. In various embodiments, an override definition 114 may include a context definition having one or more conditions and one or more override values to apply for attributes in instances in which the contextual information for a requested operation matches the context definition in an override definition 114. For example, override definition 114A for contextual override 220 includes context definition 221 that includes one or more context conditions 222. Override definition 114A further includes an override value 224 for attribute 204. As described above, in instances in which the contextual information for a requested operation matches the conditions 222 in context definition 221, the value 224 for attribute 204 may be included in the configuration data returned to application 122, rather than the default value 206 specified in the object definition 112 for the data object 202.

Note that, although override definition 114A only includes an override value for a single attribute, this is merely one non-limiting embodiment. Broadly, an override definition 114 for a contextual override may specify an override value for all attributes or any subset of attributes in an object definition 112 of the object being overridden. For example, override definition 114B includes override values 234 and 236 for attributes 204 and 208, respectively. In instances in which the contextual information for a requested operation matches the conditions 232 in context definition 231 for the contextual override 230, the values 234 and 236 for attributes 204 and 208 (respectively) may be included in the configuration data returned to the application 122, rather than the default value 206 specified in the object definition 112 for data object 202. Note that, in various embodiments, multiple different contextual overrides may apply to a single request for configuration data. That is, in some instances, the contextual information associated with a request for configuration data may match the context definitions for multiple contextual overrides of a particular data object, multiple extensions of the particular data object, a contextual override and an extension of the particular data object, or multiple contextual overrides and multiple extensions of the particular data object. Further note that, in some embodiments, the override definitions for contextual overrides and the extension definitions for extensions may further specify priority information indicating an order in which the respective overrides or extensions are to be applied in the event that multiple are relevant to a single request. In some such embodiments in which multiple contextual overrides or extensions apply for one request, all of the relevant contextual overrides and extensions (e.g., the contextual overrides and extensions for which the contextual information of the request matches the respective context definitions) may be applied in order from more precise to more general and based on the priority field(s) in the respective override definitions or extension definitions. Further, in some such embodiments, the configuration data returned to the requesting application 122 may include the default value from the base object merged with the attributes specified in the multiple overrides or extensions that matched.

Configuration data package 110 of FIG. 2A further includes extension definition 116 for contextual extension 240 of data object 202. As noted above, in various embodiments, an extension definition 116 may include a value for one or more attributes that are not included in the object definition 112, thereby "extending" the data object. In FIG. 2A, for example, extension definition 116 includes an extension value 246 for attribute 244, which is not included as part of the object definition 112 for data object 202. Extension definition 116 further includes context definition 241 with one or more context conditions 242. In instances in which the contextual information for a requested operation matches the conditions 242 in context definition 241, the value 446 for attribute 244 may be included in the configuration data returned to application 122 (potentially along with values for one or more other attributes from one or more other override definitions, extension definitions, or the object definition itself).

Definitions 112-116 may be specified using any of various suitable formats. As a non-limiting example, in some embodiments, the definitions are provided as JavaScript Object Notation (JSON) schemas. Note that, in some embodiments, definition 112-116 may include identifiers indicating the one or more configuration data packages 110 with which they are associated. For example, in some embodiments, data object 202 may be associated with multiple different applications hosted by the server system 102 and, as such, be included in multiple configuration data packages 110. In such an embodiment, the object definition 112 may include an identifier corresponding to each of the configuration data packages 110 with which the data object 202 is associated. As another example, contextual override 220 similarly may be associated with multiple different applications hosted by the server system 102 and, as such, be included in multiple configuration data packages 110. In such an embodiment, the override definition 114A for contextual override 220 may include an identifier corresponding to each of the configuration data packages 110 with which the override 220 is associated. Further note that, although configuration data package 110 is shown in FIG. 2A as a logical grouping of definitions associated with a particular data object 202, this embodiment is provided merely as one non-limiting example. In other embodiments, definitions for many different configuration data packages 110 may be stored in configuration data store 109 in any suitable format (e.g., in a Couchbase™ database) and definitions for the appropriate configuration data package(s) 110 may be retrieved for a given configuration data request 140 based on information included in that request 140.

Figure 2B:
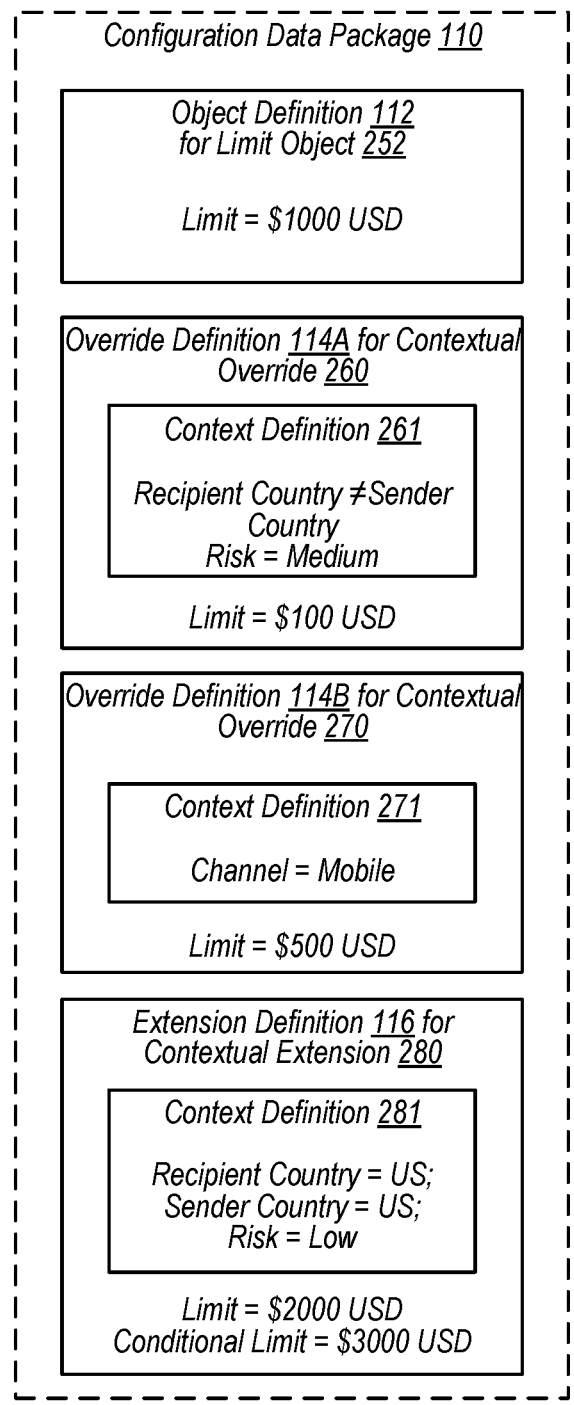
FIG. 2B is a block diagram illustrating an example of a configuration data package that includes object-oriented data corresponding to a Limit data object, according to some embodiments.

In FIG. 2B, block diagram 250 depicts one specific example of a configuration data package 110 that includes object-oriented configuration data corresponding to a "limit"

data object 252, according to one non-limiting embodiment. In the depicted example, the configuration data in the configuration data package 110 may represent one or more rules relating to transfer limits for transfers of funds between users of the server system 102, per the running example introduced above. As described below with reference to FIG. 4, a user (e.g., developer) associated with application 122 may use the disclosed techniques to represent the rules relating to transfer limits by establishing or modifying object definition 112, override definitions 114, or extension definitions 116.

For example, in the embodiment of FIG. 2B, configuration data package 110 includes object definition 112 for the limit object 252. Object definition 112, in this example, includes a single attribute, the transfer limit, and specifies a default value of $1000 USD for the limit attribute. Configuration data package 110 of FIG. 2B further includes override definitions 114 for two contextual overrides of limit data object 252: override definition 114A for contextual override 260 and override definition 114B for contextual override 270. Override definition 114A includes a context definition 261 with two conditions, a first condition that the recipient's country location is not the same as the sender's country location, and a second condition that the risk level associated with the transfer is "Medium" (e.g., on a Low-Medium-High scale). Override definition 114A further includes an override value of $100 USD for the limit attribute in instances in which the contextual information for the requested transfer satisfies the context definition 261. Override definition 114B includes a context definition 271 with a single condition that the channel used to initiate the transfer is "Mobile" (e.g., initiated from a mobile device). Override definition 114B further includes an override value of $500 USD for the limit attribute in instances in which the contextual information for the requested transfer satisfies the context definition 271.

Configuration data package 110 of FIG. 2B further includes an extension definition 116 for a contextual extension 280 of limit data object 252. Extension definition 116 in the depicted embodiment includes a context definition 281 that includes three conditions: a condition that the recipient's country location is the U.S., that the sender's country location is the U.S., and that the risk level associated with the transfer is "Low." Extension definition 116 further includes both an override value of $2000 USD for the limit attribute and an extension value of $3000 USD for an extended attribute, a "conditional limit," which may correspond to a conditional transfer limit to which the limit may be extended if one or more other conditions are satisfied (e.g., the user 136 is using an authorized client device 130). In instances in which the contextual information for the requested transfer satisfies the context definition 281, the values specified by the extension definition 116 may be included in the configuration data returned to the application 122. As will be appreciated by one of skill in the art with the benefit of this disclosure, the example described above is provided merely as one non-limiting example. In other embodiments, any suitable contextual overrides and contextual extensions may be specified as desired based on the nature of the application(s) for which the configuration data is intended.

Figure 3:
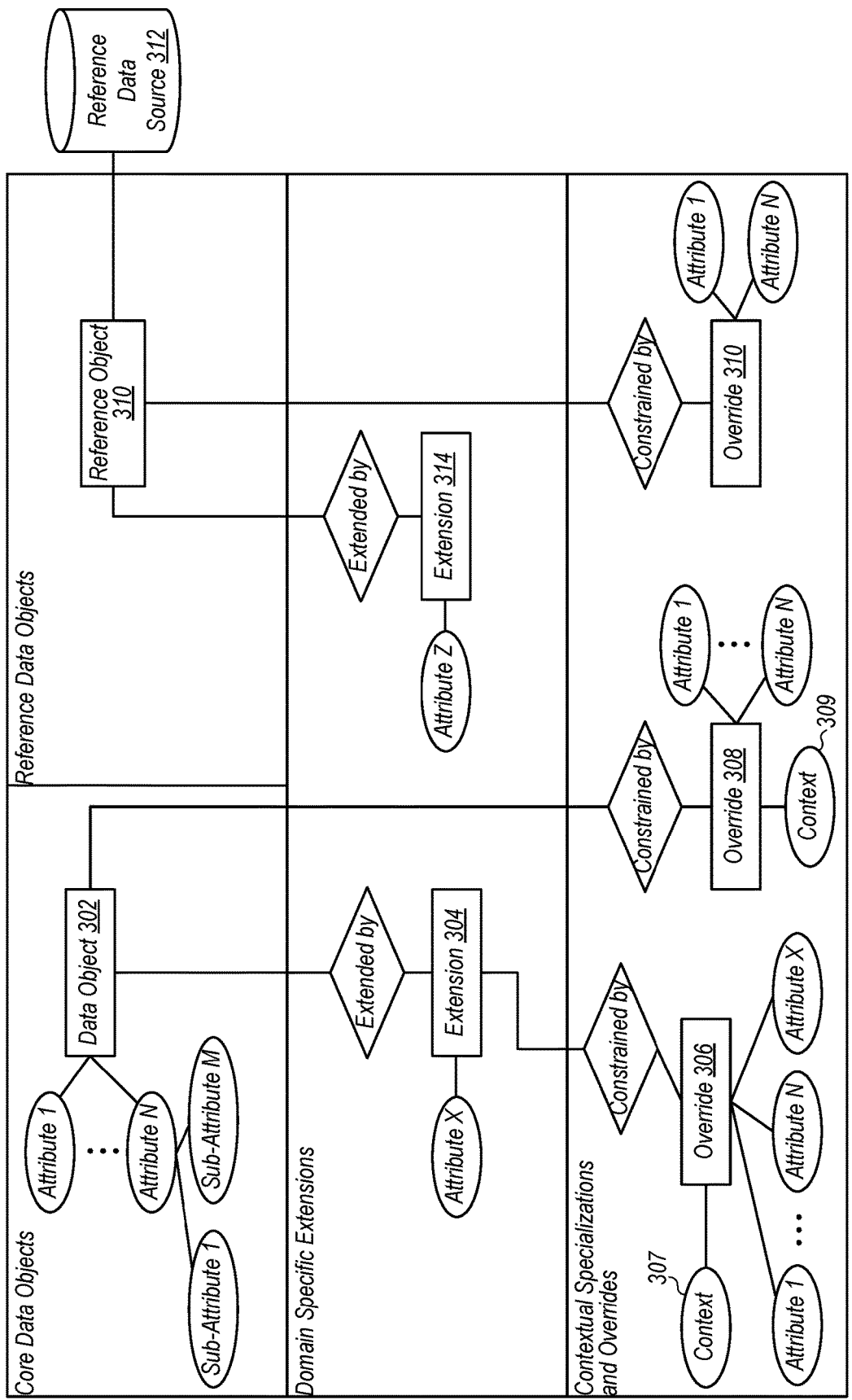
FIG. 3 is a block diagram providing a schematic depiction of the relationship between various data objects, extensions of data objects, and overrides of data objects, according to some embodiments.

In FIG. 3, block diagram 300 provides a schematic depiction of the relationship between various data objects, extensions of data objects, and overrides of data objects, according to some embodiments. More specifically, FIG. 3 depicts, in the top left corner of diagram 300 labeled "core data objects," a data object 302 that includes a number of attributes 1-N. Note that, in various embodiments, one or more of the attributes may include one or more sub attributes. For example, in FIG. 3, attribute N includes various sub-attributes 1-M. The term "core data objects," in various embodiments, may refer to those data objects that are maintained by or stored in the server system 102, as described above. In some embodiments, however, the disclosed systems and methods may also utilize data objects from outside systems. Consider, for example, an instance in which server system 102 integrates with an outside server system (not pictured, for clarity) to provide one or more web services. In such embodiments, server system 102 may utilize one or more data objects, such as reference object 310, from that system. For example, as shown in FIG. 3, reference object 310 is retrieved from an outside reference data source 312.

As noted above, a data object (such as object 302 or 310) may be used to store configuration data in the form of default values for one or more attributes (or sub-attributes). In various embodiments, the default values for these attributes may be overridden with new values for one or more of those attributes, and the object may be extended to include new attributes, for example based on context-specific, domain-specific, or non-contextual extensions of the object. For example, FIG. 3 includes domain-specific extensions, such as extension 304 of data object 302 and extension 314 of reference data object 310. In various embodiments, an extension may be considered "domain-specific" in that it applies for specific applications within a server system 102, rather than based on the context of a requested operation. For example, assume that, in the embodiment depicted in FIG. 1, server system 102 further includes an application server hosting another software application that utilizes data object 302 to provide configuration data to modify the functionality of the application. In such an embodiment, a developer of application 182 may wish to add an attribute, attribute X, to the object 302 for configuration requests 140 from the application 182. As such, the developer may create a domain-specific extension 304 for the data object 302. As shown in FIG. 3, the disclosed techniques may also enable the creation of domain-specific extension 314 of reference data object 310. In the depicted embodiment, extension 314 adds attribute Z to those attributes already included for reference data object 310.

Further, as shown in FIG. 3, the disclosed techniques may enable the creation of contextual overrides for a data object and contextual overrides of domain-specific extensions to data objects. For example, FIG. 3 includes a contextual override 308 of data object 302. In the depicted embodiment, override 308 includes a context definition 309 and override values for attributes 1-N. FIG. 3 further includes a contextual override 306 of domain-specific extension 304. As shown in the depicted embodiment, override 306 includes a context definition 307 and override values for attributes 1-N (from the data object 302) and for attribute X (from domain-specific extension 304). Although not specifically shown in FIG. 3, note that a contextual override of an object, such as contextual override 308, may itself be extended to include one or more additional attributes and corresponding extension values.

Figure 4:
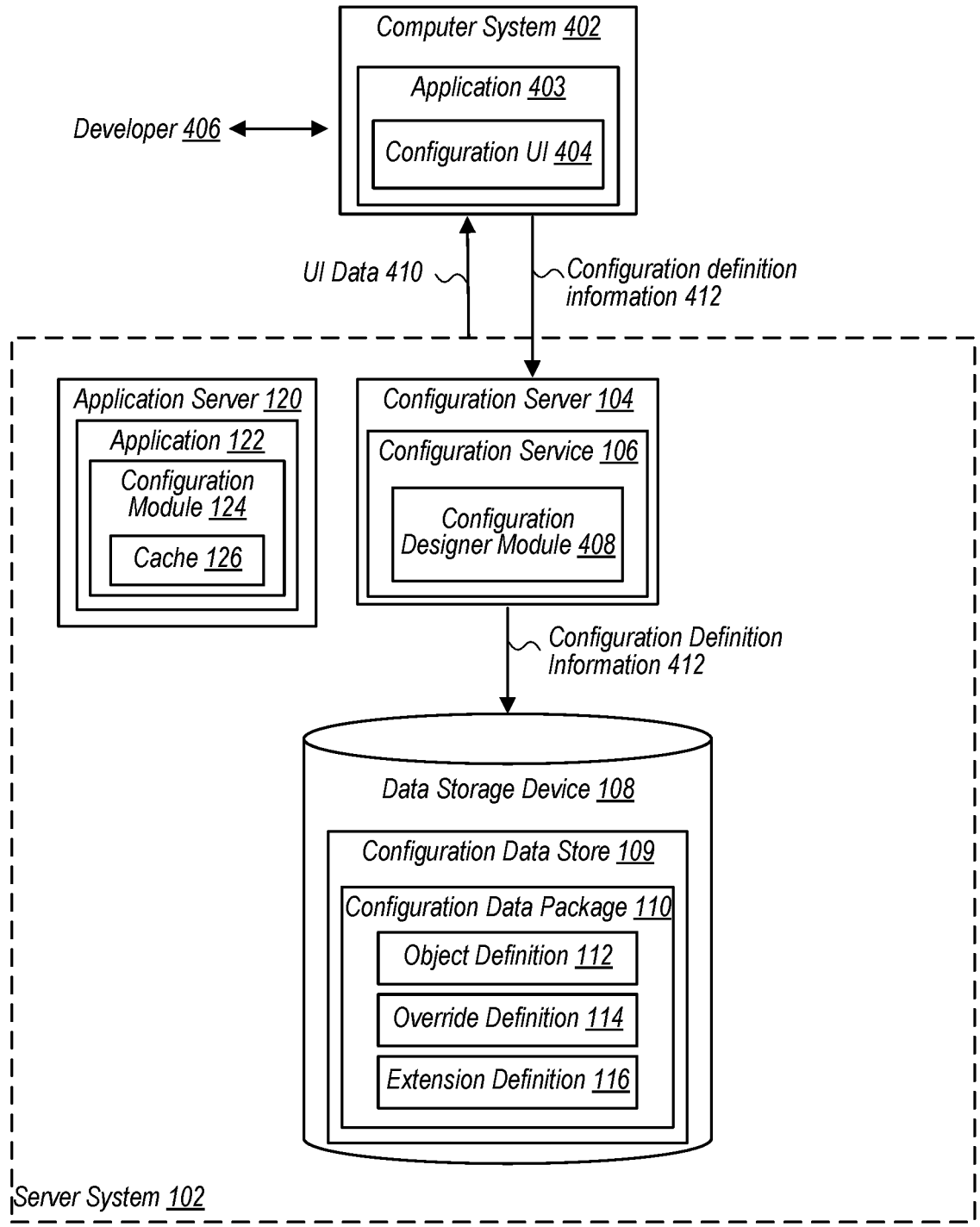
FIG. 4 is a block diagram illustrating an example server system operable to enable a user to specify object-oriented configuration data that may be used to modify the functionality of an application, according to some embodiments.

As noted above, in various embodiments, the disclosed systems and methods enable users (e.g., software developers) to specify object-oriented configuration data that may be used to modify the functionality of an application (e.g., application 122), according to some embodiments. Referring now to FIG. 4, block diagram 400 depicts a server system 102, which includes application server 120, data storage device 108, and configuration server 104. In the depicted embodiment, configuration server 104 hosts configuration service 106 that includes configuration design module 408, which, in various embodiments, is operable to receive configuration definition information 412 from one or more users and update the object-oriented configuration data stored in configuration data store 109.

For example, FIG. 4 depicts a developer 406 accessing computer system 402, which may be any of various types of computing devices, such as a laptop computer, desktop computer, smartphone, tablet device, etc. In FIG. 4, computer system 402 is shown executing software application 403 providing configuration UI 404. For example, in some embodiments, software application 403 is a web browser and the server system 102 provides UI data 410 to present the UI 404 as part of one or more webpages. In other embodiments, software application 403 may be a dedicated software application associated with the server system 102 or configuration service 106 and may be usable to provide the configuration UI 404 using the UI data 410. Note that, in some embodiments, developer 406 may be a member of a test team that creates, modifies, and tests definitions 112-116 for one or more application in, or web services provided by, server system 102.

In various embodiments, configuration UI 404 may include any suitable combination of graphical or text-based input and output elements (e.g., drop-down menus, pick lists, text boxes, etc.) that may be used by the developer 406 to define object-oriented configuration data and provide this configuration definition information 412 to the configuration service 106. In various embodiments, the developer 406 may use the configuration UI 404 to create or modify an object definition 112, an override definition 114, or an extension definition 116. For example, in some embodiments, developer 406 may use configuration UI 404 to create an object definition 112 for a new data object or may modify one or more portions of an object definition 112 for an existing data object (such as data object 202 of FIG. 2A). As non-limiting examples, a developer 406 may change the default values associated with one or more attributes, may add or remove attributes from the object definition 112, etc. Further, in some embodiments, developer 406 may use configuration UI 404 to create an override definition 114 for a new contextual override of a data object or modify an override definition 114 for an existing contextual override (e.g., contextual override 220 of FIG. 2A). As non-limiting examples, a developer 406 may add, delete, or modify one or more of the context conditions 222 in a context definition 221, may modify the override value(s) for one or more attributes, may add new attributes and new override values to the override definition, etc. Additionally, in some embodiments, a developer 406 may use configuration UI 404 to create an extension definition 116 for a new contextual (or domain-specific) extension of a data object or may modify an extension definition 116 for an existing contextual extension (e.g., contextual extension 240 of FIG. 2A) or domain-specific extension. As non-limiting examples, a developer 406 may add, delete, or modify one or more of the context conditions 242 in a context definition 241, may modify the extension value(s) for one or more attributes in the extension definition 240, may add additional attributes and extension values to the extension definition 240, etc.

Note that, in various embodiments, the ability to specify configuration data is limited to authorized users associated with the server system 102. For example, in various embodiments, developer 406 is a software developer associated with application 122 hosted by application server 120. Accordingly, in various embodiments, server system 102 may use any suitable combination of user authentication techniques to limit access to the configuration service 106. Additionally, note that although application server 120 and configuration server 104 are shown separately in FIG. 4, this embodiment is provided merely as one non-limiting example. In various embodiments, any suitable combination of hardware in server system 102 may be used to host application 122 and configuration service 106.

Example Methods

As noted above, in some embodiments, configuration module 124 is operable to receive configuration data 142 that includes one or more configuration data packages 110 and use the definition(s) included in the one or more configuration data packages 110 to determine the appropriate configuration data to return to an application 122. Referring now to FIG. 5, a flow diagram illustrating an example method 500 for providing object-oriented configuration data to an application is depicted, according to some embodiments. In various embodiments, method 500 may be performed by configuration module 124 of FIG. 1 to provide configuration data to an application 122, which the application 122 may use to modify the manner in which it performs one or more operations. For example, server system 102 may include (or have access to) a non-transitory, computer-readable medium having program instructions stored thereon that are executable by one or more computers within server system 102 (e.g., application server 120) to cause the operations described with reference to FIG. 5. In FIG. 5, method 500 includes elements 502-510. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the configuration module receives a request for configuration data that is usable to modify a performance of a particular operation by an application. For example, with reference to FIG. 1, user 136 may send a request 138 to the application 122, requesting that the application 122 perform one or more computing operation as part of the web service that it provides. Once it receives this request, application 122 may send a request for configuration data to the configuration module 124. In the depicted embodiment, the request specifies a particular data object and first contextual information.

At 504, in the illustrated embodiment, the configuration module sends a first configuration data request to a configuration service. For example, configuration module 124 may send a configuration data request 140 to configuration service 106. In some embodiments, configuration data request 140 is an HTTP request that identifies the configuration data (such as a particular data object 202 or configuration data package 110 with which the data object 202 is associated), and the configuration service 106 may use the information contained in the request 140 to retrieve the appropriate configuration data 142 from the configuration data store 109.

At 506, in the illustrated embodiment, the configuration module receives a configuration data package that includes a default definition (e.g., object definition 112) for the particular data object (e.g., data object 202) and a first override definition (e.g., override definition 114) for a first contextual override (e.g., contextual override 220) associated with the particular data object. In the depicted embodiment, the default definition includes a first default value for a first one of a set of attributes (e.g., value 206 for attribute 204), and the first override definition includes a first override value for the first attribute (e.g., value 224 for attribute 204). Note that, in some embodiments, the first override definition includes one or more context conditions (e.g., context conditions 222) setting out the context in which the override 220 is to apply.

At 508, in the illustrated embodiment, the configuration module determines that the first contextual override applies based on the first contextual information. For example, configuration module 124 may determine that the first contextual override 220 applies by comparing the contextual information provided by application 122 to the context conditions 222 included in the context definition 221. At 510, in the illustrated embodiment, the configuration module provides the configuration data to the application, where the configuration data specifies the first override value for the first attribute. For example, the configuration module 124 may provide the value 224 for attribute 204 based on a determination that the contextual override 220 applies to the request. In various embodiments, the configuration data may be returned to the application 122 in any of various suitable formats. For example, in some embodiments, the configuration data may be returned to the application 122 using JSON, as an object (e.g., a Java™ object), or in any other suitable format. In one non-limiting embodiment, element 510 may include assigning, for the particular data object, the first override value (e.g., value 224) to a field corresponding to the first attribute (e.g., attribute 204), and returning the particular data object to the application 122.

Note that, in some embodiments, the configuration module 124 may periodically poll the configuration service 106 for updates to configuration data. Accordingly, in some embodiments, method 500 further includes the configuration module retrieving, after a predetermined time interval (e.g., five minutes, 10 minutes, 60 minutes, etc.), an updated version of the configuration data package (e.g., package 110) from the configuration service and storing the updated version of the configuration data package in a cache storage 126. In some embodiments, configuration module 124 may service requests for configuration data from the application 122 using cached configuration data stored in cache 126. For example, in some embodiments, method 500 further includes the configuration module 124 receiving a subsequent request from the application 122 corresponding to the particular data object and retrieving the updated version of the configuration data package 110 from cache storage 126. The configuration module, in some such embodiments, may then provide updated configuration data to the application 122 based on the updated version of the configuration data package 110 retrieved from cache storage 126.

As noted above, in various embodiments, a given contextual override may be applied to multiple different data objects. In some embodiments, configuration data package 110 may further include a second default definition for a second data object and, in some such embodiments, method 500 may further include receiving, by the configuration module from the application, a second request for second configuration data corresponding to that second data object, where the second request includes second contextual information. Based on the second contextual information, the configuration module may determine that the first contextual override applies to the second request corresponding to the second data object, and may then provide the second configuration data to the application, where the second configuration data specifies the first override value for the first attribute.

Further, as described in detail above, a contextual extension may be used to add an attribute to a data object that is not otherwise included in the object definition for that data object. For example, in some embodiments, a configuration data package 110 may further include a first extension definition of a first contextual extension of the particular data object (e.g., extension definition 116 for contextual extension 240). In some such embodiments, the first extension definition may include a second value (e.g. value 246) to apply for a second attribute (e.g., attribute 244) in response to a determination that one or more conditions in a second context definition are met, where the second attribute is not included in the default definition (e.g., definition 112) for the particular data object. In some such embodiments, method 500 may include the configuration module determining, in response to a second request from the application for second configuration data corresponding to the particular data object, that the first contextual extension applies to the second request. The configuration module, in such embodiments, may then provide the second configuration data to the application, where the second configuration data specifies the second value for the second attribute.

As noted above, in some embodiments, configuration service 106 is operable to determine the specific item(s) of configuration data to return to the application 122 based on contextual information included in a configuration data request 140. Referring now to FIG. 6, a flow diagram illustrating an example method 600 for providing object-oriented configuration data to an application is depicted, according to some embodiments. In various embodiments, method 600 may be performed by configuration service 106 of FIG. 1 to provide configuration data 142 to a configuration module 124 on an application 122. For example, server system 102 may include (or have access to) a non-transitory, computer-readable medium having program instructions stored thereon that are executable by one or more computers within server system 102 (such as configuration server 104) to cause the operations described with reference to FIG. 6. In FIG. 6, method 600 includes elements 602-610. While these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, the configuration service receives, from an application, a first configuration data request corresponding to a particular data object, where the configuration data request includes first contextual information. For example, with reference to FIG. 1, configuration service 106 may receive, from application 122 (and, more specifically, originating from configuration module 124) a configuration data request 140. In various embodiments, application 122 may provide various computing resources to a user 136 of client device 130, and may request configuration data from configuration module 124 to modify the manner in which it performs one or more operations as part of providing these computing resources to the user 136. In some embodiments, the first contextual information may include one or more of the following types of contextual information: an identifier for a user account associated with the user 136, a channel (e.g., web browser on a mobile device, dedicated software application, etc.) used, by the user 136, to access the application 122, and a location of the user.

At 604, in the illustrated embodiment, the configuration service accesses an object definition corresponding to the particular data object. In the depicted embodiment, the object definition includes a first default value for a first attribute of a set of attributes, and a second default value for a second attribute of the set of attributes. For example, as described above with reference to FIG. 2A, an object definition 112 for data object 202 may include a first default value 206 for a first attribute 204, and a second default value 210 for a second attribute 208.

At 606, in the illustrated embodiment, the configuration service compares the first contextual information to override definitions for a plurality of contextual overrides associated with the particular data object. For example, configuration service 106 may retrieve, from configuration data store 109, override definitions 114 for one or more contextual overrides of the data object 202. Once it retrieves these override definitions 114, it may compare the contextual information included in the configuration data request 140 to context definitions included in the one or more override definitions 114. At 608, in the illustrated embodiment, the configuration service may determine, based on the comparison, that a first one of the plurality of contextual overrides applies to the first configuration data request, where the first contextual override includes a first override value for the first attribute. For example, with reference again to FIG. 2A, configuration service 106 may compare the first contextual information included in the request 140 against the context definition 221 in the override definition 114A for the contextual override 220. Based on this comparison, the configuration service 106 may determine that contextual override 220 of data object 202 applies for the configuration data request 140. In the depicted embodiment, the override definition 114A specifies an override value 224 for the first attribute 204.

At 610, in the illustrated embodiment, the configuration service provides configuration data to the application, where the configuration data specifies the first override value for the first attribute, and the second default value for the second attribute. For example, in some embodiments, the configuration data 142 may be provided using JSON data and configuration service 106 may send the configuration data 142 (e.g., as part of an HTTP message) to the requesting application 122.

As noted above, in some embodiments, a given contextual override may apply to multiple different data objects based on the contextual information. For example, in some embodiments, method 600 further includes the configuration service receiving, from the application, a second configuration data request corresponding to a second data object, where the second configuration data request includes second contextual information. In such embodiments, the configuration service may determine, based on the second contextual information, that the first contextual override applies to the first configuration data request and provide second configuration data, including the first override value for the first attribute, to the application. Further, as noted above, in some embodiments multiple different contextual overrides may apply to a single data object for a given configuration data request. For example, in some embodiments, the configuration service may further determine, based on the second contextual information, that a second, different contextual override applies to the second configuration data request, where the second contextual override includes a second override value for the second attribute. For example, configuration service 106 may determine that override 230 applies to the second configuration data request by comparing the second contextual information to the context definition 231 included in override definition 114B. In such embodiments, the second configuration data returned to the application 122 may further include a second override value (e.g. value 236) for the second attribute (e.g., attribute 208).

Additionally, in some embodiments, a contextual extension of a data object may be used to add an attribute that is not included in the default definition for that data object. Accordingly, in some embodiments, method 600 further includes the configuration service receiving, from an application, a second configuration data request corresponding to the particular data object, where the second configuration data request includes second contextual information. Based on that second contextual information, the configuration service may determine that a first contextual extension (e.g., contextual extension 240) applies for the second configuration data request. In some such embodiments, the first contextual extension may include a third value (e.g., value 246) for a third attribute (e.g., attribute 244), where the third attribute is not included in the object definition for the particular data object (e.g., object definition 112 for data object 202). The configuration service, in various embodiments, may provide second configuration data to the application, where the second configuration data specifies the third value for the third attribute.

Further, note that, in some embodiments, a contextual override may also be applied to an extension of a data object. In some such embodiments, method 600 includes the configuration service receiving, from the application, a third configuration data request corresponding to the particular data object, where the third configuration data request includes third contextual information. In such embodiments, the configuration service may determine, based on the third contextual information, that a second contextual override applies for the third configuration data request. In some such embodiments, the second contextual override is associated with the first contextual extension, where a second override definition for the second contextual override includes a second override value for the third attribute. The configuration service, in some embodiments, may then provide third configuration data to the application, where the third configuration data specifies the second override value for the third attribute.

Additionally, as discussed above, in some embodiments, data objects may be shared between different requesting applications within a server system 102. As such, in some embodiments, method 600 includes the configuration service receiving, from a second, different application, a second configuration data request corresponding to the particular data object (e.g., data object 202). The configuration service, in some embodiments, may provide second configuration data to the second, different application, where the second configuration data specifies the first default value (e.g., value 206) for the first attribute (e.g., attribute 204). Additionally, note that, in some embodiments, different applications or web services within a server system 102 may utilize different contextual overrides for a shared data object. Accordingly, in some such embodiments, method 600 may further include the configuration service determining, based on second contextual information, that a second contextual override applies for the second configuration data request, where the second contextual override includes a second override value for the second attribute. In some such embodiments, the second configuration data provided to the second, different application may specify the second override value for the second attribute.

Referring now to FIG. 7, a flow diagram illustrating an example method 700 for specifying object-oriented configuration data is depicted, according to some embodiments. In various embodiments, method 700 may be performed by configuration designer module 408 of FIG. 4. For example, server system 102 may include (or have access to) a non-transitory, computer-readable medium having program instructions stored thereon that are executable by one or more computers (e.g., hosts) within server system 102 to cause the operations described with reference to FIG. 7. In FIG. 7, method 700 includes elements 702-706. While these elements are shown in a particular order for ease of understanding, other orders may be used. In various embodiments, some of the method elements may be performed concurrently, in a different order than shown, or may be omitted. Additional method elements may also be performed as desired.

At 702, in the illustrated embodiment, the configuration designer module receives, via a configuration interface, a selection of a particular data object to override, where the particular data object includes a set of attributes, and where a first one of the set of attributes has a first default value. For example, with reference to FIG. 2A described above, the configuration designer module 408 may receive, from developer 406 via configuration UI 404, a selection of a data object 202 to override, where the object definition 112 for data object 202 specifies attribute 204 with a corresponding default value 206 and an attribute 208 with a corresponding default value 210.

At 704, in the illustrated embodiment, the configuration designer module receives, via the configuration interface, a first override definition for a first contextual override of the particular data object. In the embodiment of FIG. 7, the first override definition includes: a first context definition including one or more conditions, and a first value to apply for the first attribute in response to a determination that the one or more conditions in the first context definition are met. For example, configuration designer module 408 may receive, from developer 406 via configuration UI 404, an override definition 114A for a contextual override 220. In various embodiments, override definition 114A may include a context definition 221 with one or more context conditions 222. Further, in various embodiments, override definition 114A may specify an override value 224 to apply for attribute 204 in response to a determination that the one or more context conditions 222 in the context definition 221 are met. As noted above, in some embodiments, a contextual override may be applied to multiple different data objects. Accordingly, in various embodiments, the first override definition may identify a plurality of data objects, including the particular data object, for which to apply the first contextual override.

At 706, in the illustrated embodiment, the configuration designer module stores, in a configuration data store, the first override definition of the first contextual override. For example, in various embodiments, configuration designer module 408 may store an override definition 114 in configuration data store 109 that is stored on a data storage device 108 included in (or accessible to) server system 102.

In some embodiments, method 700 may further include the configuration designer module receiving, via the configuration interface, a second override definition of a second contextual override of the particular data object. In some such embodiments, the second override definition may include: a second context definition including one or more second conditions, and a second, different value to apply for the first attribute in response to a determination that the one or more second conditions in the second context definition are met. For example, referring again to FIG. 2A, configuration designer module 408 may further receive override definition 114B for a contextual override 230 of the data object 202. In the depicted embodiment, override definition 114B includes context definition 231 that includes one or more context conditions 232. Further, override definition 114B includes a second, different override value 234 for attribute 204 (in addition to an override value 236 for attribute 208).

Further, in some embodiments, method 700 may further include the configuration designer module receiving, via the configuration interface, a first extension definition for a first contextual extension of the particular data object. For example, as shown in FIG. 2A, configuration designer module 408 may receive extension definition 116 for a contextual extension 240 of data object 202. In some embodiments, the first extension definition may include a third value to apply for a third attribute in response to a determination that the one or more conditions in a second context definition are met, where the third attribute is not included in an object definition for the particular data object. For example, extension definition 116 includes a context definition 241 that specifies one or more context conditions 242. Further, in FIG. 2A, extension definition 116 includes an extension value 246 for an attribute 244 that is not included in the object definition 112 for the data object 202.

Example Computer System

Figure 8:
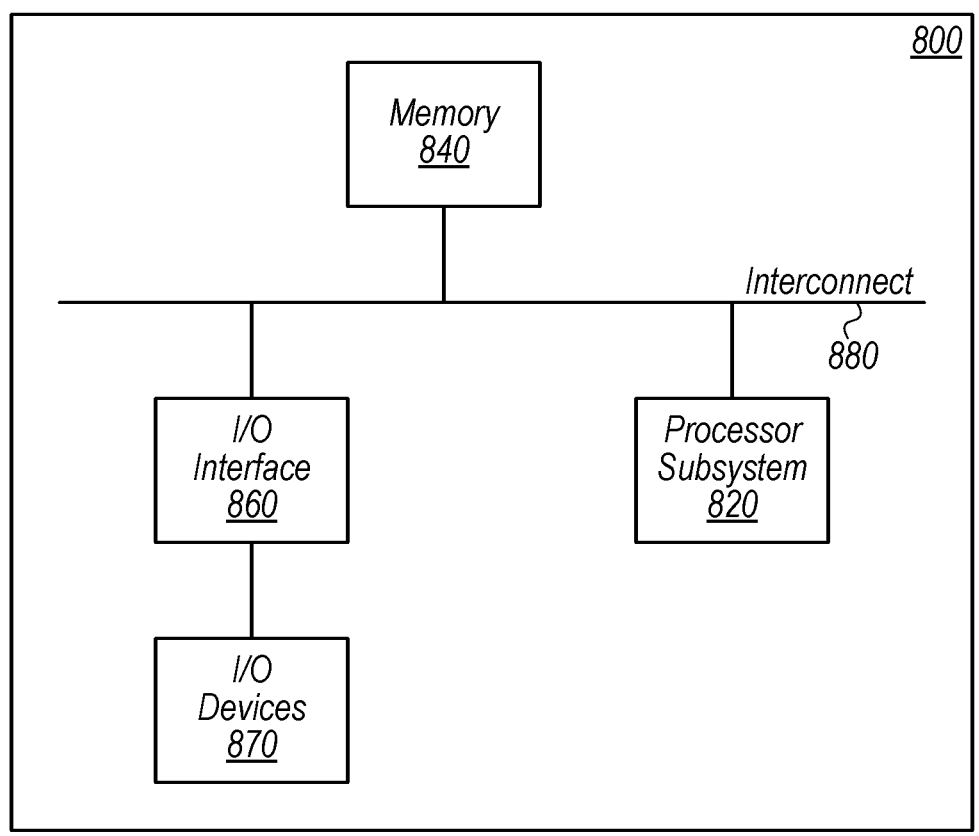
FIG. 8 is a block diagram illustrating an example computer system, according to some embodiments.

Referring now to FIG. 8, a block diagram of an example computer system 800 is depicted, which may implement one or more computer systems, such as configuration server 104 of FIG. 1, according to various embodiments. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 800 is shown in FIG. 8 for convenience, computer system 800 may also be implemented as two or more computer systems operating together.

Processor subsystem 820 may include one or more processors or processing units. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause system 800 perform various operations described herein. System memory 840 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as system memory 840. Rather, computer system 800 may also include other forms of storage such as cache memory in processor subsystem 820 and secondary storage on I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 870 includes a network interface device (e.g., configured to communicate over WiFi, Bluetooth, Ethernet, etc.), and computer system 800 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., configuration module 124, configuration service 106, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a configuration module from an application, a request for configuration data usable to modify a performance of a particular operation, wherein the request specifies a particular data object and first contextual information;
sending, by the configuration module to a configuration service, a first configuration data request;
receiving, by the configuration module from the configuration service, a configuration data package that includes:
a default definition for the particular data object, wherein the default definition includes a first default value for a first attribute of a set of attributes, and
a first override definition for a first contextual override associated with the particular data object, wherein the first override definition includes a first override value for the first attribute;
determining, by the configuration module, that the first contextual override applies based on the first contextual information; and
providing, by the configuration module, the configuration data to the application, wherein the configuration data specifies the first override value for the first attribute.

2. The method of claim 1, wherein the configuration data package further includes a second default definition for a second data object, wherein the method further comprises:
receiving, by the configuration module from the application, a second request for second configuration data corresponding to the second data object, wherein the second request includes second contextual information;
based on the second contextual information, determining, by the configuration module, that the first contextual override applies to the second request corresponding to the second data object; and
providing, by the configuration module, the second configuration data to the application, wherein the second configuration data specifies the first override value for the first attribute.

3. The method of claim 1, wherein the configuration data package further includes a first extension definition of a first contextual extension of the particular data object, wherein the first extension definition includes:
a second value to apply for a second attribute in response to a determination that one or more conditions in a second context definition are met, wherein the second attribute is not included in the default definition for the particular data object;
wherein the method further comprises:
in response to a second request from the application for second configuration data corresponding to the particular data object, determining, by the configuration module, that the first contextual extension applies to the second request; and
providing, by the configuration module, the second configuration data to the application, wherein the second configuration data specifies the second value for the second attribute.

4. The method of claim 1, wherein the first override definition specifies one or more context conditions, and wherein the determining that the first contextual override applies includes comparing the first contextual information to the one or more context conditions.

5. The method of claim 1, wherein the providing the configuration data to the application includes:
assigning, for the particular data object, the first override value to a field corresponding to the first attribute; and
returning the particular data object to the application.

6. The method of claim 1, further comprising:
retrieving, by the configuration module after a predetermined time interval, an updated version of the configuration data package from the configuration service; and
storing, by the configuration module, the updated version of the configuration data package in a cache storage.

7. The method of claim 6, further comprising:
subsequent to the providing the configuration data to the application, receiving, by the configuration module from the application, a subsequent request corresponding to the particular data object;
retrieving, by the configuration module, the updated version of the configuration data package from the cache storage; and
providing, by the configuration module, updated configuration data to the application based on the updated version of the configuration data package retrieved from the cache storage.

8. A method, comprising:
receiving, by a configuration service from an application, a first configuration data request corresponding to a particular data object, wherein the first configuration data request includes first contextual information;
accessing, by the configuration service, an object definition corresponding to the particular data object, wherein the object definition includes:
a first default value for a first attribute of a set of attributes, and
a second default value for a second attribute of the set of attributes;
comparing, by the configuration service, the first contextual information to override definitions for a plurality of contextual overrides associated with the particular data object;
based on the comparing, determining, by the configuration service, that a first one of the plurality of contextual overrides applies to the first configuration data request, wherein the first contextual override includes a first override value for the first attribute; and
providing, by the configuration service, configuration data to the application, wherein the configuration data specifies:

the first override value for the first attribute, and the second default value for the second attribute.

9. The method of claim 8, further comprising:
receiving, by the configuration service from the application, a second configuration data request corresponding to a second data object, wherein the second configuration data request includes second contextual information;
determining, by the configuration service based on the second contextual information, that the first contextual override applies to the second configuration data request; and
providing, by the configuration service, second configuration data to the application, wherein the second configuration data specifies the first override value for the first attribute.

10. The method of claim 9, further comprising:
determining, by the configuration service based on the second contextual information, that a second, different contextual override applies to the second configuration data request, wherein the second contextual override includes a second override value for the second attribute; and
wherein the second configuration data further specifies the second override value for the second attribute.

11. The method of claim 8, further comprising:
receiving, by the configuration service from the application, a second configuration data request corresponding to the particular data object, wherein the second configuration data request includes second contextual information;
determining, by the configuration service based on the second contextual information, that a first contextual extension applies for the second configuration data request, wherein the first contextual extension includes:
a third value for a third attribute, wherein the third attribute is not included in the object definition to the particular data object; and
providing, by the configuration service, second configuration data to the application, wherein the second configuration data specifies the third value for the third attribute.

12. The method of claim 11, further comprising:
receiving, by the configuration service from the application, a third configuration data request corresponding to the particular data object, wherein the third configuration data request includes third contextual information;
determining, by the configuration service based on the third contextual information, that a second contextual override applies for the third configuration data request, wherein the second contextual override is associated with the first contextual extension, and wherein a second override definition for the second contextual override includes a second override value for the third attribute; and
providing, by the configuration service, third configuration data to the application, wherein the third configuration data specifies the second override value for the third attribute.

13. The method of claim 8, further comprising:
receiving, by the configuration service from a second, different application, a second configuration data request corresponding to the particular data object; and
providing, by the configuration service, second configuration data to the second, different application, wherein the second configuration data specifies the first default value for the first attribute.

14. The method of claim 13, wherein the second configuration data request includes second contextual information, wherein the method further comprises:
determining, by the configuration service based on the second contextual information, that a second contextual override applies for the second configuration data request, wherein the second contextual override includes a second override value for the second attribute; and
wherein the second configuration data specifies the second override value for the second attribute.

15. The method of claim 8, wherein the application provides computing resources to a user, wherein the first contextual information includes one or more of the following types of contextual information:
an identifier for a user account associated with the user;
a channel used, by the user, to access the application; and
a location of the user.

16. The method of claim 8, wherein the configuration data is provided using JSON format.

17. A non-transitory, computer-readable medium having instructions stored thereon that are executable by a computer system to perform operations comprising:
receiving, via a configuration interface, a selection of a particular data object to override, wherein the particular data object includes a set of attributes, and wherein a first attribute of the set of attributes has a first default value;
receiving, via the configuration interface, a first override definition of a first contextual override of the particular data object, wherein the first override definition includes:
a first context definition including one or more conditions, and
a first value to apply for the first attribute in response to a determination that the one or more conditions in the first context definition are met; and
storing, in a configuration data store, the first override definition of the first contextual override.

18. The non-transitory, computer-readable medium of claim 17, wherein the operations further comprise:
receiving, via the configuration interface, a second override definition of a second contextual override of the particular data object, wherein the second override definition includes:
a second context definition including one or more second conditions, and
a second, different value to apply for the first attribute in response to a determination that the one or more second conditions in the second context definition are met.

19. The non-transitory, computer-readable medium of claim 17, wherein the first override definition identifies a plurality of data objects, including the particular data object, for which to apply the first contextual override.

20. The non-transitory, computer-readable medium of claim 17, wherein the operations further comprise:
receiving, via the configuration interface, a first extension definition for a first contextual extension of the particular data object, wherein the first extension definition includes:
a third value to apply for a third attribute in response to a determination that one or more conditions in a second context definition are met, wherein the third attribute is not included in an object definition for the particular data object.

* * * * *